United States Patent Office 3,736,154
Patented May 29, 1973

3,736,154
PREVENTION OF FREEZE-DAMAGE IN PERISHABLE FOODS
Bernard J. Finkle, Kensington, Calif., assignor to the United States of America as represented by the Secretary of Agriculture
No Drawing. Filed June 28, 1971, Ser. No. 157,760
Int. Cl. A23b 7/04
U.S. Cl. 99—193
1 Claim

ABSTRACT OF THE DISCLOSURE

Freeze-damage in perishable comestibles is substantially reduced by an ultra-slow cooling process.

DESCRIPTION OF THE INVENTION

The invention relates to and has among its objects the provision of a novel process for freezing perishable comestibles such as beets, carrots, yams, apples, pears, grapes, strawberries, cantaloupes, and other vegetables and fruits. Further objects of the invention will be evident from the following description wherein parts and percentages are by weight and temperatures are in degrees centigrade unless otherwise specified.

Currently, many foods are frozen to preserve them during storage periods so that the consumer can purchase a high quality food material. Rapid cooling, for example, cold air-blast techniques, is the method of choice for effecting the frozen state. It is generally though that rapid cooling provides the least damage to the plant tissue and is, therefore, the most effective means of producing frozen material. However, rapidly frozen commodities, especially those consumed in the raw state, are subject to certain deleterious effects in texture, color, odor, and flavor upon thawing. For example, thawed strawberries have a mushy texture and thawed apples exhibit an internal discoloration.

The object of the present invention is to provide a means for obviating the problem outlined above. I have discovered that ultra-slow rates of cooling produce much less freeze-damage than the rapid cooling techniques now used in the art. It should be noted that this phenomenon is completely unpredicted by the teachings in the art, and, thus, represents a totally new concept.

Basically, in accordance with the invention, the perishable commodity is frozen by applying an ultra-slow rate of cooling. The expression "ultra-slow rate" is used herein to signify a rate of cooling which is less than 1° per hour. In typical applications of the invention I have found that excellent results are achieved where the rate of cooling is about 0.1° to 0.3° per hour. Cooling rates slower than this can, of course, be employed, but are less desirable because of the long time involved.

The ultra-slow reduction of temperature can be effectuated by a freezing device equipped with a temperature programmer. Other means for producing the desired rate will be obvious to those skilled in the art.

The primary advantage of the invention is that the storage life of fruits and vegetables, especially those consumed in the raw state, is prolonged. The structure and integrity of the cells of the frozen material are maintained by the use of the invention. On the other hand, tissue frozen by rapid cooling techniques is essentially destroyed since most of the cells become disrupted or disintegrated.

Another advantage of the invention is its ease of application. Standard cooling mechanisms and techniques are employed. The rate of cooling can be controlled by an automatic temperature programmer or by the use of insulating materials.

The following description is a proposed explanation of the mechanism of the invention: Maximum physical damage to food cells occurs at the time of freezing. Water is dispersed throughout individual cells and, indeed, accounts for a large portion of cellular material. When food is subjected to rapid freezing, the water is trapped and frozen within the cell membrane. The pressure created by the frozen water causes the cell membrane to be destroyed. In ultra-slow freezing the water within the cell membrane slowly moves outside and, thus, the inner cell becomes dehydrated. As the temperature drops, this water freezes but without destruction to the cell membrane. Although I have evidence to support this explanation in part, the mechanism is still hypothetical and should not be construed to form any part of the invention. In any case, the theory does not belie the fact that the invention produces new, useful, and unobvious results.

In a typical practice of the invention the perishable commodity is first cooled at any convenient rate to a temperature near the freezing point, for example, about 1°. This preliminary cooling step is accomplished by any conventional means and forms no part of the present invention. Usually, it is preferred that this preliminary cooling be done rapidly as by cold air-blast techniques or by the use of some refrigerating medium whose temperature is well below freezing temperatures, such as Dry Ice, any of a number of fluorocarbons, such as "Freons," or other refrigerant. It is to be emphasized that the rate of cooling during this preliminary step has no critical effect, but rapid cooling is preferably used for efficiency.

After the comestible has been cooled to near the freezing point, it is further cooled, but at an ultra-slow rate, until it is frozen, typically until its temperature is about minus 4°. The cooling at the ultra-slow rate can be accomplished in any conventional freezing equipment provided with means, such as a programmer, for accurately controlling the temperature therein. The freezing equipment may, for example, be of the type wherein air at a controlled temperature is circulated about the interior. In another embodiment of the invention, an ultra-slow cooling rate is obtained by the use of thermal insulating material. To this end, the ambient temperature is set and maintained at a temperature below the freezing point. The food to be frozen is placed in a container formed of some suitable insulating material. The container is then secured inside a refrigerated area of the aforementioned type. Because the insulation reduces the heat flow from inside the container to ambient, the rate of cooling will be very much retarded. The insulator can be selected from a group of commonly used materials such as polystyrene, glass-wool, heavy cardboard, and the like.

EXAMPLES

The invention is further demonstrated by the following illustrative examples.

Example 1.—Effect of freezing rate on firmness of fruit and vegetable tissues

Whole apples were divided into three separate lots and treated as follows:

Lot 1.—Held at +2° for 48 hours in a refrigerated room. Obviously, these samples were not frozen.

Lot 2.—Rapidly cooled to +1° by cold air blast and placed in a room-size freezer with uniform forced air circulation equipped with an automatically programmed temperature control. Temperature in the apples was monitored with an iron-constantan thermocouple and automatically recorded. The apples were cooled at a rate of 0.2° per hour by continuously lowering ambient temperature from +1° to −4°, which was attained in about 40 hours. The apples were then maintained at −4° for an additional 8 hours so that the total time was 48 hours.

Lot 3.—Frozen with a cold air blast at −34° and held for 48 hours at −34° in a refrigerated room.

After 48 hours the samples in each lot were thawed in running tap water (17°). Objective measurements of firmness were made with an Instron Universal Testing Machine. One-centimeter cubes of thawed tissue were compressed in a direction perpendicular to a longitudinal section of the fruit at a standard rate until the applied force attained a maximum of 80 grams. At this time the distance of compression was measured. Since compression is inversely related to firmness, firm samples are represented by small compression values and vice-versa.

The aforementioned experiment was repeated for a number of fruits and vegetables, namely, pear, strawberry, cantaloupe, grape, beet, carrot, and yam. The results are summarized below.

| Sample | Compression (cm.) | | |
|---|---|---|---|
| | Not frozen (Lot 1) | Ultra-slow frozen (Lot 2) | Blast frozen (Lot 3) |
| Apple | 0.37 | 0.48 | 1.34 |
| Pear | 0.35 | 0.39 | 3.09 |
| Grape | 0.78 | 1.21 | 3.17 |
| Strawberry | 1.28 | 3.52 | 6.05 |
| Cantaloupe | 0.52 | 0.79 | 3.72 |
| Beet | 0.27 | 0.24 | 1.22 |
| Carrot | 0.22 | 0.25 | |
| Yam | 0.25 | 0.60 | |

Example 2.—Effect of ultra-slow and slow freezing rates on the firmness of beets Five millimeter-diameter cylinders were cut radially from red beets with a cork borer, trimmed to 20 mm. length, and washed in running tap water for 2–3 hours. The cylinders were frozen to −4° in the air-space of a chamber held in a refrigerated alcohol bath. The rate of freezing was controlled by the bath temperature and the thickness of plastic-foam insulation separating the samples from the outer wall of the chamber. The temperature within the samples was sensed by thermistor-tipped needles implanted in representative cylinders. In this way an ultra-slow rate (0.16° per hour) and a less slow rate (3.3° per hour) of cooling were obtained. In the former case −4° was reached in 23 hours and in the latter case, in 2.5 hours. A control sample was not frozen but was maintained at +2° for 25 hours.

The samples were thawed in running tap water (17°). Objective measurements of firmness were made as described in Example 1.

The results are summarized below.

| Sample | Compression, cm. | | |
|---|---|---|---|
| | Not frozen +2° | Ultra-slow frozen (0.16°/hr. to −4°) | Slow frozen (3.3°/hr. to −4°) |
| Beet | 0.32 | 0.43 | 1.57 |

Having thus described my invention, I claim:

1. A process for freezing a perishable commodity selected from the group consisting of fruits and vegetables with minimum freeze damage, which comprises—
    (a) cooling the comestible at a rapid rate to a temperature of about +1° C.,
    (b) further cooling the comestible at a rate of about from 0.1° to 0.3° C. per hour until the temperature of the comestible is about minus 4° C., and
    (c) holding the comestible in the frozen state until thawing is desired.

References Cited

UNITED STATES PATENTS

| | | | |
|---|---|---|---|
| 2,917,389 | 12/1959 | Earle | 99—193 |
| 2,909,040 | 10/1959 | Newell | 62—64 |
| 2,103,925 | 12/1937 | Zarotschenzeff | 62—64 |
| 3,219,463 | 11/1965 | Lamb | 99—193 |
| 3,009,814 | 11/1961 | Rivoche | 99—194 |
| 2,745,756 | 5/1956 | Ruff | 99—195 |
| 1,696,441 | 12/1928 | Mann | 62—62 |
| 3,092,974 | 6/1963 | Haumann | 62—64 |

OTHER REFERENCES

Refrigerating Engineering, February 1949, pp. 148–151, Lee, "Effect of Freezing Rate on Vegetables."

NORMAN YUDKOFF, Primary Examiner

H. H. BERNSTEIN, Assistant Examiner